United States Patent
Wu et al.

(10) Patent No.: US 11,538,177 B2
(45) Date of Patent: Dec. 27, 2022

(54) VIDEO STITCHING METHOD AND DEVICE

(71) Applicant: TSINGHUA UNIVERSITY, Beijing (CN)

(72) Inventors: Huaqiang Wu, Beijing (CN); Qinglin He, Beijing (CN); Chen Hu, Beijing (CN); Xuguang Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 142 days.

(21) Appl. No.: 17/049,347

(22) PCT Filed: Dec. 24, 2019

(86) PCT No.: PCT/CN2019/127805
§ 371 (c)(1),
(2) Date: Oct. 21, 2020

(87) PCT Pub. No.: WO2020/135394
PCT Pub. Date: Jul. 2, 2020

(65) Prior Publication Data
US 2021/0264622 A1 Aug. 26, 2021

(30) Foreign Application Priority Data

Dec. 28, 2018 (CN) .......................... 201811625266.X

(51) Int. Cl.
*G06T 7/33* (2017.01)

(52) U.S. Cl.
CPC .... *G06T 7/337* (2017.01); *G06T 2207/10016* (2013.01); *G06T 2207/20221* (2013.01)

(58) Field of Classification Search
None
See application file for complete search history.

(56) References Cited

U.S. PATENT DOCUMENTS

2016/0286138 A1  9/2016  Kim

FOREIGN PATENT DOCUMENTS

| CN | 101646022 A | * | 2/2010 |
| CN | 101646022 A |   | 2/2010 |
| CN | 106991644 A |   | 7/2017 |

(Continued)

OTHER PUBLICATIONS

China National Intellectual Property Administration, International Search Report, dated Mar. 23, 2020, 5 pages.

*Primary Examiner* — Delomia L Gilliard
(74) *Attorney, Agent, or Firm* — Loeb & Loeb LLP

(57) ABSTRACT

Disclosed are a video stitching method and a video stitching device. The video stitching method is applicable for stitching a first video and a second video, and includes: performing feature extraction, feature matching and screening on a first target frame of the first video and a second target frame of the second video, so as to obtain a first feature point pair set; performing forward tracking on the first target frame and the second target frame, so as to obtain a second feature point pair set; performing backward tracking on the first target frame and the second target frame, so as to obtain a third feature point pair set; and calculating a geometric transformation relationship between the first target frame and the second target frame according to a union of the first feature point pair set, the second feature point pair set and the third feature point pair set.

20 Claims, 3 Drawing Sheets

(56) References Cited

FOREIGN PATENT DOCUMENTS

| CN | 108307200 | A |   | 7/2018  |           |
|----|-----------|---|---|---------|-----------|
| CN | 108470354 | A | * | 8/2018  | G06T 7/246 |
| CN | 108737743 | A |   | 11/2018 |           |
| CN | 108921776 | A |   | 11/2018 |           |
| TW | I639136   | B |   | 10/2018 |           |

* cited by examiner

VIDEO STITCHING METHOD AND DEVICE

The present application is a PCT US National Phase application claiming priority to the PCT International Application PCT/CN2019/127805, filed on Dec. 24, 2019, which claims priority to Chinese patent application No. 201811625266.X entitled "Video Stitching Method and Device" and filed on Dec. 28, 2018, and the entire disclosure of the aforementioned applications is incorporated herein by reference as part of the present application.

TECHNICAL FIELD

Embodiments of the present disclosure relate to a video stitching method and a video stitching device.

BACKGROUND

Video stitching is an important technology in the field of computer vision. The process of video stitching is to stitch and synthesize video images which have overlapping areas and are acquired by multiple cameras onto the same view surface, so as to form a panoramic video with higher resolution and wider viewing angle. Compared with obtaining a panoramic video by using a panoramic camera with a wide-angle lens, obtaining a panoramic video by using the video stitching technology has lower cost and higher practicality. In real life, video stitching technology has been applied to various fields such as security surveillance, aerial reconnaissance, display and exhibition, visual entertainment, etc.

SUMMARY

At least one embodiment of the present disclosure provides a video stitching method applicable for stitching a first video and a second video, which includes: extracting features respectively from a first target frame of the first video and a second target frame of the second video, performing feature matching on the features respectively extracted from the first target frame and the second target frame, and screening matched features, so as to obtain a first feature point pair set between the first target frame and the second target frame; performing forward tracking of a forward feature point pair set between the first target frame and the second target frame on the first target frame and the second target frame, so as to obtain a second feature point pair set between the first target frame and the second target frame; performing backward tracking of a backward feature point pair set between the first target frame and the second target frame on the first target frame and the second target frame, so as to obtain a third feature point pair set between the first target frame and the second target frame; and calculating a geometric transformation relationship between the first target frame and the second target frame according to a union of the first feature point pair set, the second feature point pair set and the third feature point pair set between the first target frame and the second target frame.

For example, the video stitching method provided by some embodiments of the present disclosure further includes: taking a union of the first feature point pair set and the second feature point pair set between the first target frame and the second target frame as a forward feature point pair set between a next frame of the first target frame of the first video and a next frame of the second target frame of the second video.

For example, the video stitching method provided by some embodiments of the present disclosure further includes: in a case where the first target frame and the second target frame are beginning frames to be stitched, not performing forward tracking, calculating the geometric transformation relationship between the first target frame and the second target frame according to a union of the first feature point pair set and the third feature point pair set between the first target frame and the second target frame, and taking the first feature point pair set between the first target frame and the second target frame as a forward feature point pair set between the next frame of the first target frame of the first video and the next frame of the second target frame of the second video.

For example, the video stitching method provided by some embodiments of the present disclosure further includes: in a case where a count of video frames to be stitched after the first target frame and the second target frame is less than a target frame number of backward tracking, taking final frames to be stitched of both the first video and the second video as starting frames of backward tracking.

For example, the video stitching method provided by some embodiments of the present disclosure further includes: in a case where the first target frame and the second target frame are starting frames of backward tracking of certain frames to be stitched of both the first video and the second video, taking the first feature point pair set between the first target frame and the second target frame as a backward feature point pair set between a previous frame of the first target frame of the first video and a previous frame of the second target frame of the second video; and in a case where the first target frame and the second target frame are middle frames of backward tracking of certain frames to be stitched of both the first video and the second video, taking a union of the first feature point pair set and the third feature point pair set between the first target frame and the second target frame as a backward feature point pair set between the previous frame of the first target frame of the first video and the previous frame of the second target frame of the second video.

For example, the video stitching method provided by some embodiments of the present disclosure further includes: in a case where the first target frame and the second target frame are final frames to be stitched, not performing backward tracking, and calculating the geometric transformation relationship between the first target frame and the second target frame according to a union of the first feature point pair set and the second feature point pair set between the first target frame and the second target frame.

For example, in the video stitching method provided by some embodiments of the present disclosure, the target frame number of backward tracking is in a range of 1-20.

For example, the video stitching method provided by some embodiments of the present disclosure further includes: in a case where a count of feature point pairs of the second feature point pair set between the first target frame and the second target frame is greater than a first threshold, performing stochastic filtering on the second feature point pair set between the first target frame and the second target frame.

For example, the video stitching method provided by some embodiments of the present disclosure further includes: in a case where a count of feature point pairs of the third feature point pair set between the first target frame and the second target frame is greater than a second threshold, performing stochastic filtering on the third feature point pair set between the first target frame and the second target frame.

For example, the video stitching method provided by some embodiments of the present disclosure further includes: stitching the first target frame and the second target frame according to the geometric transformation relationship between the first target frame and the second target frame, and outputting a panoramic picture of the first target frame and the second target frame.

For example, the video stitching method provided by some embodiments of the present disclosure further includes: taking frames of each pair to be stitched of both the first video and the second video as the first target frame and the second target frame, respectively, and outputting a panoramic picture of the frames of the each pair to be stitched, so as to form a panoramic video.

For example, in the video stitching method provided by some embodiments of the present disclosure, the first video and the second video are online videos or offline videos.

At least one embodiment of the present disclosure further provides a video stitching device, which includes: a memory; and a processor, wherein executable instructions are stored in the memory, and the executable instructions can be executed by the processor to implement the video stitching method provided by any one embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
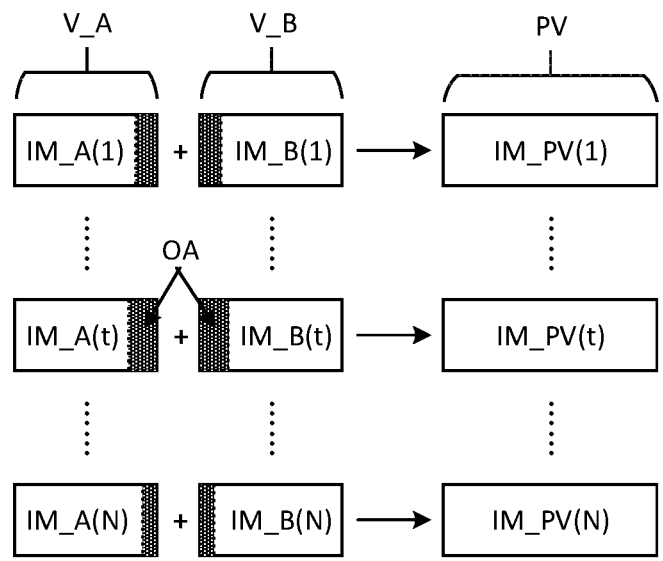
FIG. 1 is a schematic diagram of a video stitching principle.

FIG. 1 illustrates the video stitching principle. As shown in FIG. 1, a first video V_A includes N frames to be stitched (e.g., IM_A(1), ..., IM_A(t), IM_A(N)), and correspondingly, a second video V_B also includes N frames to be stitched (e.g., IM_B(1), ..., IM_B(t), ..., IM_B(N)). The video stitching principle is to stitch each frame to be stitched of the first video V_A and each frame to be stitched of the second video V_B in one-to-one correspondence. For instance, the initial frame IM_A(1) to be stitched of the first video V_A and the initial frame IM_B(1) to be stitched of the second video V_B are stitched to obtain a first stitched frame IM_PV(1); ...; the t-th frame IM_A(t) to be stitched of the first video V_A and the t-th frame IM_B(t) to be stitched of the second video V_B are stitched to obtain the t-th stitched frame IM_PV(t); ...; and the final frame IM_A(N) to be stitched of the first video V_A and the final frame IM_B(N) to be stitched of the second video V_B are stitched to obtain a final stitched frame IM_PV(t). The plurality of stitched frames (IM_PV(1), ..., IM_PV(t), ..., IM_PV(N)) form a panoramic video PV in sequence.

It should be noted that in order to enable a video stitching device to realize automatic video stitching, image boundaries of frames of each pair to be stitched of the first video V_A and the second video V_B are required to be partially overlapped. For instance, as shown in FIG. 1, an overlapping area OA is formed at image boundaries of IM_A(t) and IM_B(t), where t=1, ..., N. It should also be noted that overlapping areas of image boundaries of different frames to be stitched of the first video V_A and the second video V_B can be the same or different, without being limited in the present disclosure.

It should be noted that objects of video stitching may not be limited to the above two videos, and for example, the objects of video stitching may include three or more videos, as long as these videos can be stitched. For instance, in some examples, the objects of video stitching include three videos; a first video and a second video can be stitched at first to form a middle video; and then the middle video and a third video can be stitched to form a required panoramic video. It should be noted that the present disclosure includes but is not limited thereto. For instance, the first video and the third video can be respectively stitched with the second video to finally form a panoramic video based on the viewing angle of the second video.

It should be noted that the first video V_A and the second video V_B can be offline videos, that is, frames of each pair to be stitched of the first video V_A and the second video V_B have been obtained before video stitching; and the first video V_A and the second video V_B can also be online videos, and a video stitching device processes and stitches obtained frames to be stitched while receiving new frames to be stitched, namely stitching the online videos in real time or in quasi real time.

Figure 2:
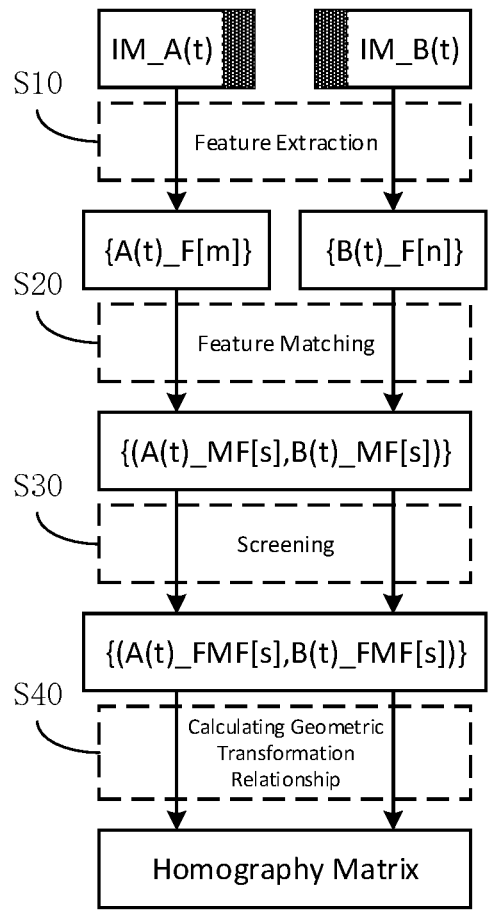
FIG. 2 is a flowchart of a video stitching method.

FIG. 2 is a flowchart illustrating a video stitching method. The video stitching method includes processing frames of each pair to be stitched of the first video V_A and the second video V_B according to steps S10 to S40. Steps S10 to S40 will be described below by taking the t-th frame IM_A(t) to be stitched of the first video V_A as a first target frame and taking the t-th frame IM_B(t) to be stitched of the second video V_B as a second target frame, where t=1, . . . , N.

Step S10: extracting features respectively from a first target frame IM_A(t) of the first video and a second target frame IM_B(t) of the second video, so as to obtain respective feature point sets {A(t)_F(m)} and {B(t)_F(n)}.

For instance, feature extraction can be performed by selectively adopting, for example, Scale-Invariant Feature Transform (SIFT) algorithm, Speeded Up Robust Features (SURF) algorithm or Oriented FAST and Rotated BRIEF (ORB) algorithm, etc., according to features of video images. No limitation will be given here in the present disclosure.

It should be noted that both m and n are formal parameters, where m=1, 2, . . . , and n=1, 2, . . . .

Step S20: performing feature matching on the feature point sets {A(t)_F[m]} and {B(t)_F[n]} respectively extracted from the first target frame IM_A(t) and the second target frame IM_B(t), so as to obtain a matched feature point pair set {(A(t)_MF[s], B(t)_MF[s])}.

For instance, K-Nearest Neighbor (KNN) algorithm or the like can be adopted to perform feature matching on the feature point sets {A(t)_F[m]} and {B(t)_F[n]} respectively extracted. For example, as for a certain feature point in the first target frame IM_A(t), a most similar feature point is found in the second target frame IM_B(t), so as to form a matched feature point pair (A(t)_MF[s], B(t)_MF[s]). Moreover, a plurality of matched feature point pairs form a matched feature point pair set {(A(t) MF[s], B(t)_MF[s])}, where s is a formal parameter, and s=1, 2, . . . . For instance, in the KNN algorithm, K=2 may be selected. The present disclosure includes but is not limited thereto. It should be noted that the algorithm adopted for feature matching is not limited in the present disclosure.

Step S30: screening the matched feature point pair set {(A(t)_MF[s], B(t)_MF[s])}, so as to obtain a first feature point pair set {(A(t)_FMF[s], B(t)_FMF[s])}.

Because there may be mismatching in the feature matching of step S20, the matched feature point pair set {(A(t)_MF[s], B(t)_MF[s])} is usually required to be screened, so as to remove matched feature point pairs obtained due to mismatching and retain matched feature points obtained due to optimum matching to form the first feature point pair set {(A(t)_FMF[s], B(t)_FMF[s])}. For instance, Random SAmple Consensus (RANSAC) algorithm or the like can be adopted to screen the matched feature point pair set {(A(t)_MF[s], B(t)_MF[s])} obtained in step S20. It should be noted that the algorithm adopted for screening is not limited in the present disclosure.

Step S40: calculating a geometric transformation relationship between the first target frame IM_A(t) and the second target frame IM_B(t) according to the first feature point pair set {(A(t)_FMF[s], B(t)_FMF[s])}, so as to determine a homography matrix between the first target frame IM_A(t) and the second target frame IM_B(t).

For instance, in some examples, least square method (LSM) can be adopted to calculate the homography matrix between the first target frame IM_A(t) and the second target frame IM_B(t). For instance, in some examples, a homography matrix corresponding to optimum matching obtained by screening through RANSAC algorithm in step S30 can be taken as the homography matrix between the first target frame IM_A(t) and the second target frame IM_B(t). It should be noted that the algorithm adopted for calculating the geometric transformation relationship between the first target frame IM_A(t) and the second target frame IM_B(t) is not limited in the present disclosure.

It should be noted that the calculating the geometric transformation relationship between the first target frame IM_A(t) and the second target frame IM_B(t) to determine the homography matrix between the first target frame IM_A (t) and the second target frame IM_B(t), is to perform camera calibration on the first target frame IM_A(t) and the second target frame IM_B(t).

The video stitching method as shown in FIG. 2 can stitch the first target frame IM_A(t) and the second target frame IM_B(t) to obtain a corresponding stitched frame IM_PV(t) according to the result of camera calibration on the first target frame IM_A(t) and the second target frame IM_B(t), namely according to the geometric transformation relationship (the homography matrix) between the first target frame IM_A(t) of the first video V_A and the second target frame IM_B(t) of the second video V_B. Moreover, takes t=1, . . . , N, and a plurality of stitched frames IM_PV(1), . . . , IM_PV(N) can be obtained, and then a panoramic video PV is obtained.

It should be noted that in steps S10 to S40, the video stitching method as shown in FIG. 2 only uses feature points of target frames to be stitched (namely the first target frame and the second target frame) to perform feature matching, and then finishes camera calibration. This method of performing camera calibration based on target frames of a single pair does not consider the continuity in time of frames of each pair of the videos, which may result in that the camera calibration of different target frames changes irregularly over time, and may finally cause that the switching of some adjacent stitched frames has obvious jitter phenomenon when the obtained panoramic video is playing.

At least one embodiment of the present disclosure provides a video stitching method, which is applicable for stitching a first video and a second video. The video stitching method includes: extracting features from a first target frame of the first video and a second target frame of the second video, performing feature matching on the features respectively extracted from the first target frame and the second target frame, and screening matched features, so as to obtain a first feature point pair set between the first target frame and the second target frame; performing forward tracking of a forward feature point pair set between the first target frame and the second target frame on the first target frame and the second target frame, so as to obtain a second feature point pair set between the first target frame and the second target frame; performing backward tracking of a backward feature point pair set between the first target frame and the second target frame on the first target frame and the second target frame, so as to obtain a third feature point pair set between the first target frame and the second target frame; and calculating a geometric transformation relationship between the first target frame and the second target frame according to a union of the first feature point pair set, the second feature point pair set and the third feature point pair set between the first target frame and the second target frame.

At least one embodiment of the present disclosure further provides a video stitching device corresponding to the above video stitching method.

The video stitching method and device provided by the embodiments of the present disclosure combine feature matching and bidirectional feature tracking to perform camera calibration, thereby improving the robustness of feature point pairs for camera calibration, and improving the continuity and stability of camera calibration.

The embodiments of the present disclosure will be described below in detail with reference to the accompanying drawings.

Figure 3:
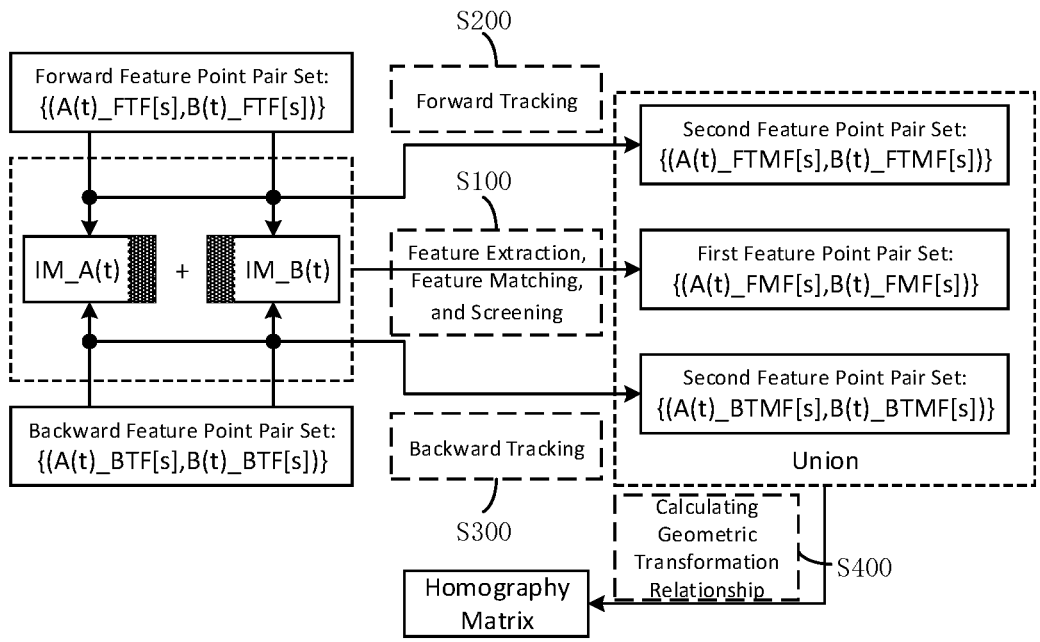
FIG. 3 is a flowchart of a video stitching method provided by some embodiments of the present disclosure.

FIG. 3 is a flowchart illustrating a video stitching method. As shown in FIG. 3, the video stitching method includes steps S100 to S400.

Step S100: extracting features respectively from a first target frame IM_A(t) of a first video and a second target frame IM_B(t) of a second video, performing feature matching on the features respectively extracted from the first target frame IM_A(t) and the second target frame IM_B(t), and screening matched features, so as to obtain a first feature point pair set $\{(A(t)\_FMF[s], B(t)\_FMF[s])\}$ between the first target frame and the second target frame.

For instance, in some examples, step S100 can include steps S10 to S30 of the existing video stitching method as shown in FIG. 2, that is, the detailed description and the technical effects of step S100 can be referred to the related description of steps S10 to S30. No further description will be given here in the present disclosure.

Step S200: performing forward tracking of a forward feature point pair set $\{(A(t)\_FTF[s], B(t)\_FTF[s])\}$ between the first target frame IM_A(t) and the second target frame IM_B(t) on the first target frame IM_A(t) and the second target frame IM_B(t), so as to obtain a second feature point pair set $\{(A(t)\_FTMF[s], B(t)\_FTMF[s])\}$ between the first target frame IM_A(t) and the second target frame IM_B(t).

For instance, in some examples, Kanade-Lucas-Tomasi tracking algorithm or the like can be adopted for forward tracking, and no limitation will be given here in the present disclosure. It should be noted that the forward feature point pair set $\{(A(t)\_FTF[s], B(t)\_FTF[s])\}$ between target frames to be stitched (namely the first target frame and the second target frame) of both the first video and the second video is obtained based on frames before the target frames. Thus, the video stitching method considers the continuity in time of the target frames and the frames before the target frames of the videos.

Step S300: performing backward tracking of a backward tracking feature point pair set $\{(A(t)\_BTF[s], B(t)\_BTF[s])\}$ between the first target frame IM_A(t) and the second target frame IM_B(t) on the first target frame IM_A(t) and the second target frame IM_B(t), so as to obtain a third feature point pair set $\{(A(t)\_BTMF[s], B(t)\_BTMF[s])\}$ between the first target frame IM_A(t) and the second target frame IM_B(t).

For instance, in some examples, Kanade-Lucas-Tomasi tracking algorithm or the like can be adopted for backward tracking, and no limitation will be given here in the present disclosure. It should be noted that the backward feature point pair set $\{(A(t)\_BTF[s], B(t)\_BTF[s])\}$ between target frames to be stitched of both the first video and the second video is obtained based on frames after the target frames. Thus, the video stitching method considers the continuity in time of the target frames and the frames after the target frames of the videos.

Step S400: calculating a geometric transformation relationship between the first target frame IM_A(t) and the second target frame IM_B(t) according to a union of the first feature point pair set $\{(A(t)\_FMF[s], B(t)\_FMF[s])\}$, the second feature point pair set $\{(A(t)\_FTMF[s], B(t)\_FTMF[s])\}$ and the third feature point pair set $\{(A(t)\_BTMF[s], B(t)\_BTMF[s])\}$ between the first target frame IM_A(t) and the second target frame IM_B(t).

Because there may be duplicate feature points in the first feature point pair set, the second feature point pair set and the third feature point pair set, the union thereof can be adopted for camera calibration. For instance, in some examples, LSM or RANSAC algorithm or the like can be adopted for calculating the geometric transformation relationship between the first target frame IM_A(t) and the second target frame IM_B(t), so as to determine the corresponding homography matrix. It should be noted that the algorithm, adopted for calculating the geometric transformation relationship between the first target frame IM_A(t) and the second target frame IM_B(t), is not limited in the present embodiment.

It should be noted that the video stitching method as shown in FIG. 3 combines feature matching (step S100) and bidirectional feature tracking (forward tracking in step S200 and backward tracking in step S300) for camera calibration, thereby improving the robustness of feature point pairs for camera calibration, and improving the continuity and stability of camera calibration.

Figure 4:
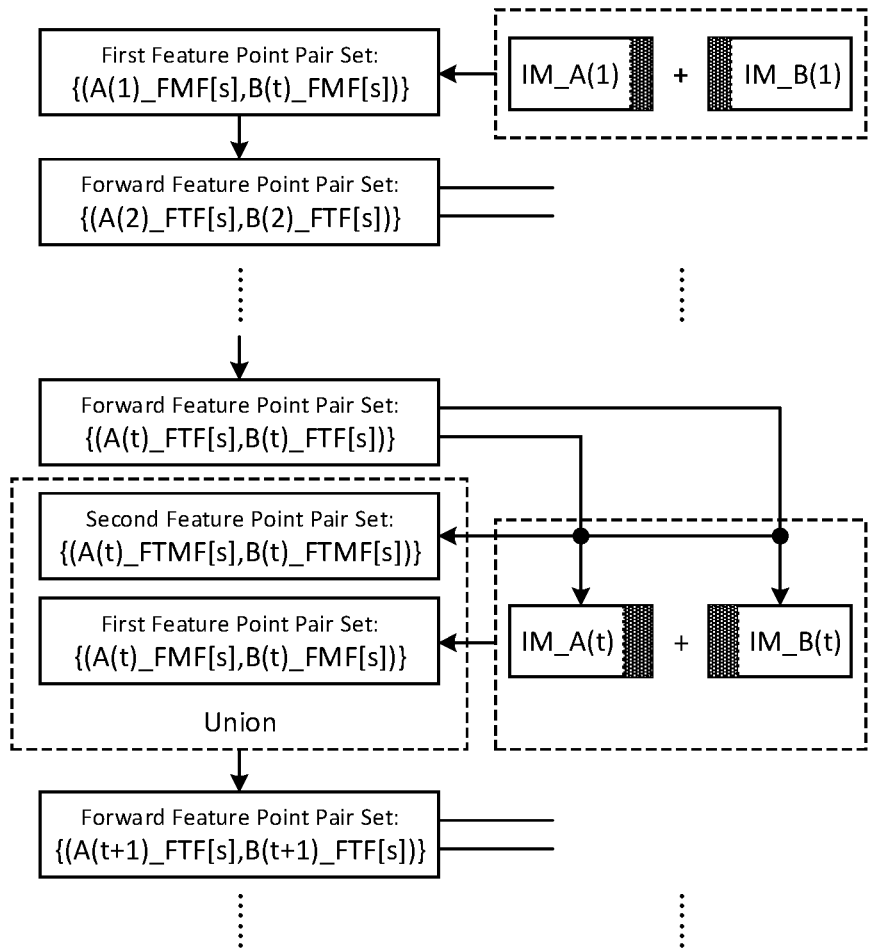
FIG. 4 is a flowchart of forward tracking in the video stitching method as shown in FIG. 3 provided by some embodiments of the present disclosure.

FIG. 4 is a flowchart illustrating forward tracking in the video stitching method as shown in FIG. 3. The process of forward tracking corresponds to the above step S200. Beginning frames IM_A(1) and IM_B(1) to be stitched of both the first video and the second video are taken as starting frames of forward tracking, and forward tracking is performed on frames of each pair to be stitched after the starting frames in order. The key of forward tracking is to determine a forward feature point pair set between frames of each pair to be stitched of both the first video and the second video.

As shown in FIG. 4, the video stitching method provided by the embodiment of the present disclosure can further include: taking a union of the first feature point pair set $\{(A(t)\_FMF[s], B(t)\_FMF[s])\}$ and the second feature point pair set $\{(A(t)\_FTMF[s], B(t)\_FTMF[s])\}$ between the first target frame IM_A(t) and the second target frame IM_B(t) as a forward feature point pair set $\{(A(t+1)\_FTF[s], B(t+1)\_FTF[s])\}$ between a next frame IM_A(t+1) (not shown in FIG. 4) of the first target frame IM_A(t) of the first video and a next frame IM_B(t+1) (not shown in FIG. 4) of the second target frame IM_B(t) of the second video.

More specifically, in the case where the first target frame IM_A(t) and the second target frame IM_B(t) are beginning frames to be stitched (namely IM_A(1) and IM_B(1)), the first target frame IM_A(t) and the second target frame IM_B(t) do not have a corresponding forward feature point pair set $\{(A(1)\_FTF[s], B(1)\_FTF[s])\}$, and forward tracking cannot be performed thereon, so that the first target frame IM_A(1) and the second target frame IM_B(1) do not have a corresponding second feature point pair set $\{(A(1)\_FTMF[s], B(1)\_FTMF[s])\}$ and need to be processed separately.

For instance, in some examples, the video stitching method provided by the embodiment of the present disclosure can further include: in the case where the first target frame and the second target frame are beginning frames IM_A(1) and IM_B(1) to be stitched, not performing forward tracking, and calculating the geometric transformation relationship between the first target frame IM_A(1) and the second target frame IM_B(1) according to a union of the first feature point pair set $\{(A(1)\_FMF[s], B(1)\_FMF[s])\}$ and the third feature point pair set $\{(A(1)\_BTMF[s], B(1)\_BTMF[s])\}$ between the first target frame IM_A(1) and the second target frame IM_B(1); and as shown in FIG. 4, taking the first feature point pair set {(A(1)_FMF[s], B(1)_FMF[s])} between the first target frame IM_A(1) and the second target frame IM_B(1) as a forward feature point pair set {(A(2)_FTF[s], B(2)_FTF[s])} between the next frame IM_A(2) (not shown in FIG. 4) of the first target frame IM_A(1) of the first video and the next frame IM_B(2) (not shown in FIG. 4) of the second target frame IM_B(1) of the second video.

Figure 5:
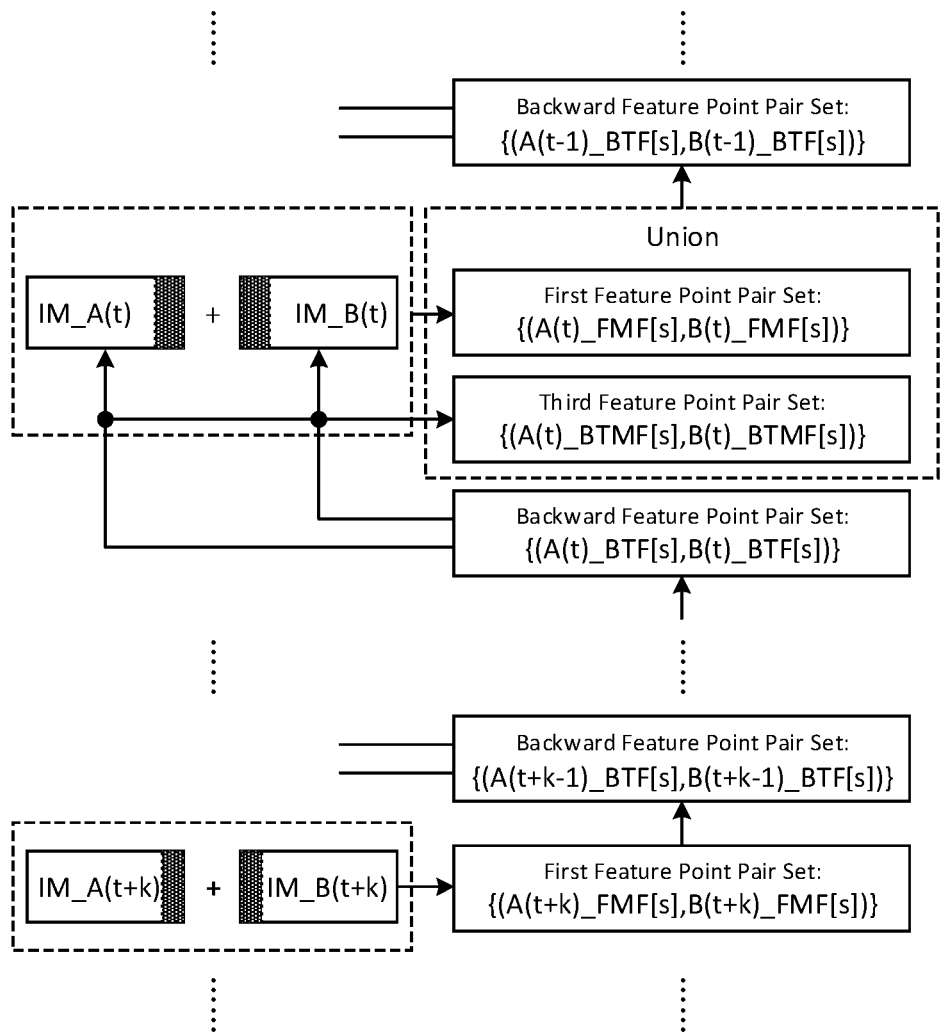
FIG. 5 is a flowchart of backward tracking in the video stitching method as shown in FIG. 3 provided by some embodiments of the present disclosure.

FIG. 5 is a flowchart illustrating backward tracking in the video stitching method as shown in FIG. 3. The process of backward tracking corresponds to the above step S300. When backward tracking is performed on target frames IM_A(t) and IM_B(t) to be stitched of both the first video and the second video, the k-th frames IM_A(t+k) and IM_B(t+k) after the target frames IM_A(t) and IM_B(t) to be stitched of both the first video and the second video are taken as starting frames of backward tracking, and backward tracking is performed on frames of each pair before the starting frames IM_A(t+k) and IM_B(t+k) of backward tracking in reverse order, until the target frames IM_A(t) and IM_B(t) to be stitched are tracked. Herein, k refers to a target frame number of backward tracking and can be taken as an integer greater than 0. The key of backward tracking is to determine the starting frames of backward tracking and a backward feature point pair set of frames of each pair to be stitched of both the first video and the second video.

For instance, in some examples, the video stitching method provided by the embodiment of the present disclosure can further include: in the case where a count of video frames to be stitched after the first target frame IM_A(t) and the second target frame IM_B(t) is less than the target frame number k of backward tracking, taking final frames IM_A(N) and IM_B(N) to be stitched of both the first video and the second video as starting frames of backward tracking.

It should be noted that the case in which the count of video frames to be stitched after the target frames to be stitched is less than the target frame number k of backward tracking generally occurs when k is greater than 1. In this case, as for target frames to be stitched, IM_A(N−k+1) and IM_B(N−k+1), . . . , IM_A(N−1) and IM_B(N−1), the count of video frames to be stitched after these frames is respectively k−1, . . . , 1 and is less than the target frame number k of backward tracking, that is, backward tracking cannot be performed for k times, so the final frames IM_A(N) and IM_B(N) to be stitched are taken as starting frames of backward tracking of these target frames to be stitched, and the target frame number of backward tracking of these target frames to be stitched is correspondingly reduced.

It should be noted that the process of backward tracking of the target frames to be stitched from the starting frames of backward tracking is similar to the process of forward tracking of the target frames to be stitched from the starting frames of forward tracking (for example, the beginning frames to be stitched), so the details and the principles of the backward tracking process can be referred to the related description on the details and the principles of the forward tracking process.

For instance, in some examples, as shown in FIG. 5, the video stitching method provided by the embodiment of the present disclosure can further include: in the case where the first target frame and the second target frame are starting frames of backward tracking of certain frames to be stitched of both the first video and the second video, taking the first feature point pair set between the first target frame and the second target frame as a backward feature point pair set between a previous frame of the first target frame of the first video and a previous frame of the second target frame of the second video. More specifically, for instance, in the case where IM_A(t+k) and IM_B(t+k) are taken as the first target frame and the second target frame and are starting frames of backward tracking of certain frames to be stitched (IM_A(t) and IM_B(t) of both the first video and the second video, a first feature point pair set {(A(t+k)_FMF[s], B(t+k)_FMF[s])} between the first target frame IM_A(t+k) and the second target frame IM_B(t+k) is taken as a backward feature point pair set {(A(t+k−1)_BTF[s], B(t+k−1)_BTF[s])} between the previous frame IM_A(t+k−1) (not shown in FIG. 5) of the first target frame IM_A(t+k) of the first video and the previous frame IM_B(t+k−1) (not shown in FIG. 5) of the second target frame IM_B(t+k) of the second video.

For instance, in some examples, as shown in FIG. 5, the video stitching method provided by the embodiment of the present disclosure can further include: in the case where the first target frame and the second target frame are middle frames of backward tracking of certain frames to be stitched of both the first video and the second video, taking a union of the first feature point pair set and the third feature point pair set between the first target frame and the second target frame as a backward feature point pair set between the previous frame of the first target frame of the first video and the previous frame of the second target frame of the second video. More specifically, taking the target frame number of backward tracking k=2 as an example, IM_A(t) and IM_B(t) are taken as the first target frame and the second target frame and are middle frames of backward tracking of certain frames to be stitched (IM_A(t−1) and IM_B(t−1) not shown in FIG. 5) of both the first video and the second video; in this case, IM_A(t+1) and IM_B(t+1) are starting frames of backward tracking of the frames to be stitched IM_A(t−1) and IM_B(t−1); and a union of the first feature point pair set {(A(t)_FMF[s], B(t)_FMF[s])} and the third feature point pair set {(A(t)_BTMF[s], B(t)_BTMF[s])} between the first target frame IM_A(t) and the second target frame IM_B(t) is taken as a backward feature point pair set {(A(t−1)_BTF[s], B(t−1)_BTF[s])} between the previous frame IM_A(t−1) of the first target frame IM_A(t) of the first video and the previous frame IM_B(t−1) of the second target frame IM_B(t) of the second video. It should be noted that the case in which k=2 is illustrative here, and the present disclosure includes but is not limited thereto. For instance, k can also be an integer greater than 2. It should be also noted that in the case where k=1, middle frames of backward tracking are not present in the backward tracking process, and in this case, the video stitching method provided by the embodiment of the present disclosure may not include the processing of the middle frames of backward tracking. In addition, the video stitching method provided by the embodiment of the present disclosure can also include the processing of the middle frames of backward tracking, which does not affect the implementation of video stitching.

It should be noted that in the forward tracking process, forward tracking cannot be performed on the beginning frames IM_A(1) and IM_B(1) to be stitched, so the beginning frames IM_A(1) and IM_B(1) to be stitched have no corresponding second feature point pair set, and need to be processed separately; and correspondingly, in the backward tracking process, backward tracking cannot be performed on the final frames IM_A(N) and IM_B(N) to be stitched, so the final frames IM_A(N) and IM_B(N) to be stitched have no corresponding third feature point pair set, and need to be processed separately.

For instance, in some examples, the video stitching method provided by the embodiment of the present disclosure can further include: in the case where the first target frame and the second target frame are the final frames IM_A(N) and IM_B(N) to be stitched, not performing backward tracking, and calculating the geometric transformation relationship between the first target frame IM_A(N) and the second target frame IM_B(N) according to a union of a first feature point pair set {(A(N)_FMF[s], B(N)_FMF[s])} and a second feature point pair set {(A(N)_FTMF[s], B(N)_FTMF[s])} between the first target frame IM_A(N) and the second target frame IM_B(N).

It should be noted that the value of the target frame number of backward tracking is not limited in the video stitching method provided by the embodiment of the present disclosure. For instance, in some examples, the target frame number k of backward tracking can be, for example, 1-20, for example, 1-10, for example, 1-5, for example, 1, so that the video stitching method not only can be used for stitching offline videos but also can be used for stitching online videos in quasi real time. For instance, in some examples, as for the offline videos of which the total number of video frames to be stitched is N, the target frame number k of backward tracking can be N−1, and in this case, the backward tracking process and the forward tracking process can be considered as the same (the difference is that forward tracking is in order and backward tracking is in reverse order). For instance, in some examples, as for online videos, the target frame number k of backward tracking can be an integer greater than 20, and no limitation will be given here in the present disclosure. It should be noted that as for online videos, when the value of the target frame number k of backward tracking is greater, the quasi real time property of video stitching is poorer, but the continuity in time of the target frames and the frames after the target frames is better.

For instance, in some examples, the video stitching method provided by the embodiment of the present disclosure can further include: in the case where a count of feature point pairs of the second feature point pair set {(A(t)_FTMF[s], B(t)_FTMF[s])} between the first target frame IM_A(t) and the second target frame IM_B(t) is greater than a first threshold, performing stochastic filtering on the second feature point pair set {(A(t)_FTMF[s], B(t)_FTMF[s])} between the first target frame IM_A(t) and the second target frame IM_B(t). It should be noted that the stochastic filtering of the second feature point pair set between the target frames (the first target frame and the second target frame) is to perform random removal on feature point pairs of the second feature point pair set, so that the number of the retained feature point pairs in the second feature point pair set does not exceed the first threshold, thereby maintaining the relative stability of corresponding weight of the second feature point pair set in the forward feature point pair set between the frames of next pair of the target frames, and further maintaining the stability of forward tracking on the frames of next pair of the target frames.

For instance, in some examples, the video stitching method provided by the embodiment of the present disclosure can further include: in the case where a count of feature point pairs of the third feature point pair set {(A(t)_BTMF[s], B(t)_BTMF[s])} between the first target frame IM_A(t) and the second target frame IM_B(t) is greater than a second threshold, performing stochastic filtering on the third feature point pair set {(A(t)_BTMF[s], B(t)_BTMF[s])} between the first target frame IM_A(t) and the second target frame IM_B(t). It should be noted that the stochastic filtering of the third feature point pair set between the target frames (the first target frame and the second target frame) is to perform random removal on feature point pairs of the third feature point pair set, so that the number of the retained feature point pairs in the third feature point pair set does not exceed the second threshold, thereby maintaining the relative stability of corresponding weight of the third feature point pair set in the backward feature point pair set between the frames of previous pair of the target frames, and further maintaining the stability of backward tracking on the frames of previous pair of the target frames.

It should be noted that the limitation of the number of feature point pairs in the second feature point pair set and the third feature point pair set between the target frames by stochastic filtering can also maintain the relative stability of corresponding weights of the second feature point pair set and the third feature point pair set in the union of the first feature point pair set, the second feature point pair set and the third feature point pair set between the target frames, so the homography matrix, obtained by calculating the geometric transformation relationship between the first target frame and the second target frame according to the union, is equivalent to being weighted over time. Thus, the transformation in time of the homography matrices corresponding to adjacent frames to be stitched is smoother, thereby realizing stable camera calibration.

For instance, in some examples, the video stitching method provided by the embodiment of the present disclosure can further include: stitching the first target frame and the second target frame according to the geometric transformation relationship between the first target frame and the second target frame, and outputting a panoramic picture of the first target frame and the second target frame. It should be noted that in the process of stitching the first target frame and the second target frame, there may be a stitching seam on the panoramic picture due to the difference in factors such as exposure on an overlapping area of boundaries of the two image frames. Thus, the pixel values in the overlapping area of the two image frames can also be subjected to weighted fusion to eliminate the stitching seam.

For instance, in some examples, the video stitching method provided by the embodiment of the present disclosure can further include: taking frames of each pair to be stitched of both the first video and the second video as the first target frame and the second target frame, respectively, and outputting a panoramic picture of the frames of the each pair to be stitched, so as to form a panoramic video. The process of forming the panoramic video can be referred to FIG. 1 and the related description of FIG. 1 in the present disclosure. No further description will be given here.

For instance, in the video stitching method provided by the embodiment of the present disclosure, the first video and the second video can be online videos or offline videos. It should be noted that in the case where both the first video and the second video are online videos, the target frame number k of backward tracking in the video stitching method provided by the embodiment of the present disclosure can be set to be a relatively small value, for example, 1-20, for example 1-10, for example, 1-5, for example, 1, so as to realize quasi real-time stitching.

It should be noted that in the embodiment of the present disclosure, the process of the above video stitching method can include more or fewer steps, and these steps can be executed in sequence or in parallel. In the process of the video stitching method described above, the execution order of the steps is subject to the implementation of video stitching, and is not limited by serial number marks of the steps.

Figure 6:
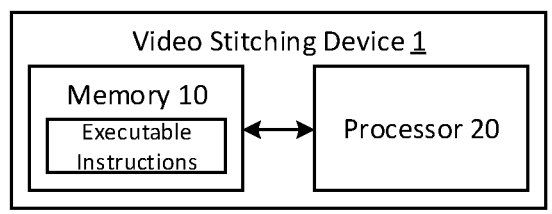
FIG. 6 is a schematic diagram of a video stitching device provided by some embodiments of the present disclosure.

At least one embodiment of the present disclosure further provides a video stitching device. As shown in FIG. 6, the video stitching device 1 includes a memory 10 and a processor 20. Executable instructions are stored in the memory 10 and the executable instructions can be executed by the processor 20 to implement the video stitching method provided by any embodiment of the present disclosure.

The memory 10 can include one or more computer program products which may include various forms of computer-readable storage media, such as a volatile memory and/or a nonvolatile memory. The volatile memory can include, for example, a random access memory (RAM) and/or a cache. The nonvolatile memory can include, for example, a read-only memory (ROM), a hard disc, a flash memory, etc. The above executable instructions can be stored on the computer-readable storage medium.

The processor 20 can be implemented by at least one hardware form of a digital signal processor (DSP), a field programmable gate array (FPGA) or a programmable logic array (PLA), can include one or more central processing units (CPUs) or other forms of processing units with data processing capacity and/or instruction executing capacity, and can control necessary structures, units or modules (not shown in FIG. 6) in the video stitching device 1 to execute desirable functions. For instance, the processor 20 can execute the above executable instructions to perform video stitching according to the video stitching method provided by any embodiment of the present disclosure.

It should be noted that not all the structures of the video stitching device are described in the embodiment of the present disclosure. For the video stitching device to implement the video stitching method provided by the embodiment of the present disclosure, it should be understood by those skilled in the art that the video stitching device can further include other necessary structures, units or modules. For instance, the video stitching device 1 can further include a video receiving unit, a panoramic video output unit, etc. No limitation will be given here in the embodiment of the present disclosure.

What have been described above are only specific implementations of the present disclosure, the protection scope of the present disclosure is not limited thereto. Therefore, the protection scope of the present disclosure should be based on the protection scope of the claims

What is claimed is:

1. A video stitching method, applicable for stitching a first video and a second video, comprising:
   extracting features respectively from a first target frame of the first video and a second target frame of the second video, performing feature matching on the features respectively extracted from the first target frame and the second target frame, and screening matched features, so as to obtain a first feature point pair set between the first target frame and the second target frame;
   performing forward tracking of a forward feature point pair set between the first target frame and the second target frame on the first target frame and the second target frame, so as to obtain a second feature point pair set between the first target frame and the second target frame;
   performing backward tracking of a backward feature point pair set between the first target frame and the second target frame on the first target frame and the second target frame, so as to obtain a third feature point pair set between the first target frame and the second target frame; and
   calculating a geometric transformation relationship between the first target frame and the second target frame according to a union of the first feature point pair set, the second feature point pair set and the third feature point pair set between the first target frame and the second target frame.

2. The video stitching method according to claim 1, further comprising:
   taking a union of the first feature point pair set and the second feature point pair set between the first target frame and the second target frame as a forward feature point pair set between a next frame of the first target frame of the first video and a next frame of the second target frame of the second video.

3. The video stitching method according to claim 1, further comprising:
   in a case where the first target frame and the second target frame are beginning frames to be stitched, not performing forward tracking, calculating the geometric transformation relationship between the first target frame and the second target frame according to a union of the first feature point pair set and the third feature point pair set between the first target frame and the second target frame, and taking the first feature point pair set between the first target frame and the second target frame as a forward feature point pair set between a next frame of the first target frame of the first video and a next frame of the second target frame of the second video.

4. The video stitching method according to claim 1, further comprising:
   in a case where a count of video frames to be stitched after the first target frame and the second target frame is less than a target frame number of backward tracking, taking final frames to be stitched of both the first video and the second video as starting frames of backward tracking.

5. The video stitching method according to claim 4, wherein the target frame number of backward tracking is in a range of 1-20.

6. The video stitching method according to claim 1, further comprising:
   in a case where the first target frame and the second target frame are starting frames of backward tracking of certain frames to be stitched of both the first video and the second video, taking the first feature point pair set between the first target frame and the second target frame as a backward feature point pair set between a previous frame of the first target frame of the first video and a previous frame of the second target frame of the second video; and
   in a case where the first target frame and the second target frame are middle frames of backward tracking of certain frames to be stitched of both the first video and the second video, taking a union of the first feature point pair set and the third feature point pair set between the first target frame and the second target frame as a backward feature point pair set between the previous frame of the first target frame of the first video and the previous frame of the second target frame of the second video.

7. The video stitching method according to claim 1, further comprising:
   in a case where the first target frame and the second target frame are final frames to be stitched, not performing backward tracking, and calculating the geometric transformation relationship between the first target frame and the second target frame according to a union of the first feature point pair set and the second feature point pair set between the first target frame and the second target frame.

8. The video stitching method according to claim 1, further comprising:
in a case where a count of feature point pairs of the second feature point pair set between the first target frame and the second target frame is greater than a first threshold, performing stochastic filtering on the second feature point pair set between the first target frame and the second target frame.

9. The video stitching method according to claim 1, further comprising:
in a case where a count of feature point pairs of the third feature point pair set between the first target frame and the second target frame is greater than a second threshold, performing stochastic filtering on the third feature point pair set between the first target frame and the second target frame.

10. The video stitching method according to claim 1, further comprising:
stitching the first target frame and the second target frame according to the geometric transformation relationship between the first target frame and the second target frame, and outputting a panoramic picture of the first target frame and the second target frame.

11. The video stitching method according to claim 10, further comprising:
taking frames of each pair to be stitched of both the first video and the second video as the first target frame and the second target frame, respectively, and outputting a panoramic picture of the frames of the each pair to be stitched, so as to form a panoramic video.

12. The video stitching method according to claim 10, further comprising:
in a case where the first target frame and the second target frame are beginning frames to be stitched, not performing forward tracking, and calculating the geometric transformation relationship between the first target frame and the second target frame according to a union of the first feature point pair set and the third feature point pair set between the first target frame and the second target frame.

13. The video stitching method according to claim 10, further comprising:
in a case where the first target frame and the second target frame are final frames to be stitched, not performing backward tracking, and calculating the geometric transformation relationship between the first target frame and the second target frame according to a union of the first feature point pair set and the second feature point pair set between the first target frame and the second target frame.

14. The video stitching method according to claim 1, wherein the first video and the second video are online videos or offline videos.

15. A video stitching device, comprising:
a memory; and
a processor,
wherein executable instructions are stored in the memory, and the executable instructions can be executed by the processor to implement a video stitching method,
the video stitching method is applicable for stitching a first video and a second video, and comprises:
extracting features respectively from a first target frame of the first video and a second target frame of the second video, performing feature matching on the features respectively extracted from the first target frame and the second target frame, and screening matched features, so as to obtain a first feature point pair set between the first target frame and the second target frame;
performing forward tracking of a forward feature point pair set between the first target frame and the second target frame on the first target frame and the second target frame, so as to obtain a second feature point pair set between the first target frame and the second target frame;
performing backward tracking of a backward feature point pair set between the first target frame and the second target frame on the first target frame and the second target frame, so as to obtain a third feature point pair set between the first target frame and the second target frame; and
calculating a geometric transformation relationship between the first target frame and the second target frame according to a union of the first feature point pair set, the second feature point pair set and the third feature point pair set between the first target frame and the second target frame.

16. The video stitching device according to claim 15, wherein the video stitching method further comprises:
in a case where the first target frame and the second target frame are beginning frames to be stitched, not performing forward tracking, and calculating the geometric transformation relationship between the first target frame and the second target frame according to a union of the first feature point pair set and the third feature point pair set between the first target frame and the second target frame.

17. The video stitching device according to claim 15, wherein the video stitching method further comprises:
in a case where the first target frame and the second target frame are final frames to be stitched, not performing backward tracking, and calculating the geometric transformation relationship between the first target frame and the second target frame according to a union of the first feature point pair set and the second feature point pair set between the first target frame and the second target frame.

18. The video stitching device according to claim 15, wherein the video stitching method further comprises:
taking frames of each pair to be stitched of both the first video and the second video as the first target frame and the second target frame, respectively, and outputting a panoramic picture of the frames of the each pair to be stitched, so as to form a panoramic video.

19. The video stitching device according to claim 15, wherein the first video and the second video are online videos or offline videos.

20. The video stitching device according to 15, wherein the video stitching method further comprises:
stitching the first target frame and the second target frame according to the geometric transformation relationship between the first target frame and the second target frame, and outputting a panoramic picture of the first target frame and the second target frame.

* * * * *